(12) United States Patent
Mohamed et al.

(10) Patent No.: US 9,935,737 B2
(45) Date of Patent: Apr. 3, 2018

(54) ACCESS POINT (AP), USER STATION (STA) AND METHOD FOR SPATIAL MODULATION ORTHOGONAL FREQUENCY DIVISION MULTIPLEXING (SM-OFDM) COMMUNICATION

(71) Applicant: Intel IP Corporation, Santa Clara, CA (US)

(72) Inventors: Ahmed Gamal Helmy Mohamed, Richardson, TX (US); Eldad Perahia, Portland, OR (US); Shahrnaz Azizi, Cupertino, CA (US); Thomas J. Kenney, Portland, OR (US); Mohamed K. Hassanin, SunnyVale, CA (US)

(73) Assignee: Intel IP Corporation, Santa Clara, CA (US)

( * ) Notice: Subject to any disclaimer, the term of this patent is extended or adjusted under 35 U.S.C. 154(b) by 198 days.

(21) Appl. No.: 14/748,791

(22) Filed: Jun. 24, 2015

(65) Prior Publication Data
US 2016/0381684 A1 Dec. 29, 2016

(51) Int. Cl.
*H04W 72/04* (2009.01)
*H04L 1/00* (2006.01)
*H04B 7/02* (2017.01)
*H04L 5/00* (2006.01)

(52) U.S. Cl.
CPC .......... *H04L 1/0071* (2013.01); *H04B 7/028* (2013.01); *H04L 1/0041* (2013.01); *H04L 5/0023* (2013.01); *H04L 5/0044* (2013.01)

(58) Field of Classification Search
None
See application file for complete search history.

(56) References Cited

U.S. PATENT DOCUMENTS

| | | | | |
|---|---|---|---|---|
| 7,729,438 B2 * | 6/2010 | Ouyang | ............... | H04B 7/0689 375/267 |
| 2004/0081131 A1 * | 4/2004 | Walton | ................. | H04B 7/0421 370/344 |
| 2004/0165676 A1 * | 8/2004 | Krishnan | ............... | H04W 52/42 375/267 |
| 2005/0147076 A1 * | 7/2005 | Sadowsky | ............ | H04B 7/0408 370/343 |
| 2006/0088115 A1 * | 4/2006 | Chen | ................. | H03M 13/2717 375/260 |
| 2008/0037673 A1 * | 2/2008 | Ahn | ..................... | H04B 7/0413 375/261 |

(Continued)

*Primary Examiner* — Candal Elpenord
(74) *Attorney, Agent, or Firm* — Schwegman Lundberg & Woessner, P.A.

(57) ABSTRACT

Embodiments of an access point (AP), user station (STA), and method for spatial modulation orthogonal frequency division multiplexing (SM-OFDM) communication in a wireless network are generally described herein. The AP may transmit an SM-OFDM signal that comprises multiple OFDM signals. The SM-OFDM signal may be transmitted in channel resources that comprise multiple sub-carriers and the OFDM signals may be based at least partly on data symbols for used data portions of the sub-carriers. The used data portions may be based on a first portion of encoded bits and the data symbols for the used data portions may be based on a second portion of the encoded bits. In some examples, the used data portions of the sub-carriers may be different for at least some of the OFDM signals.

21 Claims, 7 Drawing Sheets

(56) References Cited

U.S. PATENT DOCUMENTS

2010/0329236 A1* 12/2010 Sampath ........... H04W 56/0005
370/350
2014/0079150 A1* 3/2014 Tong .................... H04L 1/0068
375/295

* cited by examiner

ACCESS POINT (AP), USER STATION (STA) AND METHOD FOR SPATIAL MODULATION ORTHOGONAL FREQUENCY DIVISION MULTIPLEXING (SM-OFDM) COMMUNICATION

TECHNICAL FIELD

Embodiments pertain to wireless networks. Some embodiments relate to wireless local area networks (WLANs) and Wi-Fi networks including networks operating in accordance with the IEEE 802.11 family of standards, such as the IEEE 802.11ac standard or the IEEE 802.11ax study group (SG) (named DensiFi). Some embodiments relate to high-efficiency (HE) wireless or high-efficiency WLAN or Wi-Fi (HEW) communications. Some embodiments relate to spatial modulation orthogonal frequency division multiplexing (SM-OFDM) techniques. Some embodiments relate to multiple-input multiple-output (MIMO) communications and orthogonal frequency division multiple access (OFDMA) communication techniques.

BACKGROUND

Wireless communications has been evolving toward ever increasing data rates (e.g., from IEEE 802.11a/g to IEEE 802.11n to IEEE 802.11ac). In high-density deployment situations, overall system efficiency may become more important than higher data rates. For example, in high-density hotspot and cellular offloading scenarios, many devices competing for the wireless medium may have low to moderate data rate requirements (with respect to the very high data rates of IEEE 802.11ac). A recently-formed study group for Wi-Fi evolution referred to as the IEEE 802.11 High Efficiency WLAN (HEW) study group (SG) (i.e., IEEE 802.11ax) is addressing these high-density deployment scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
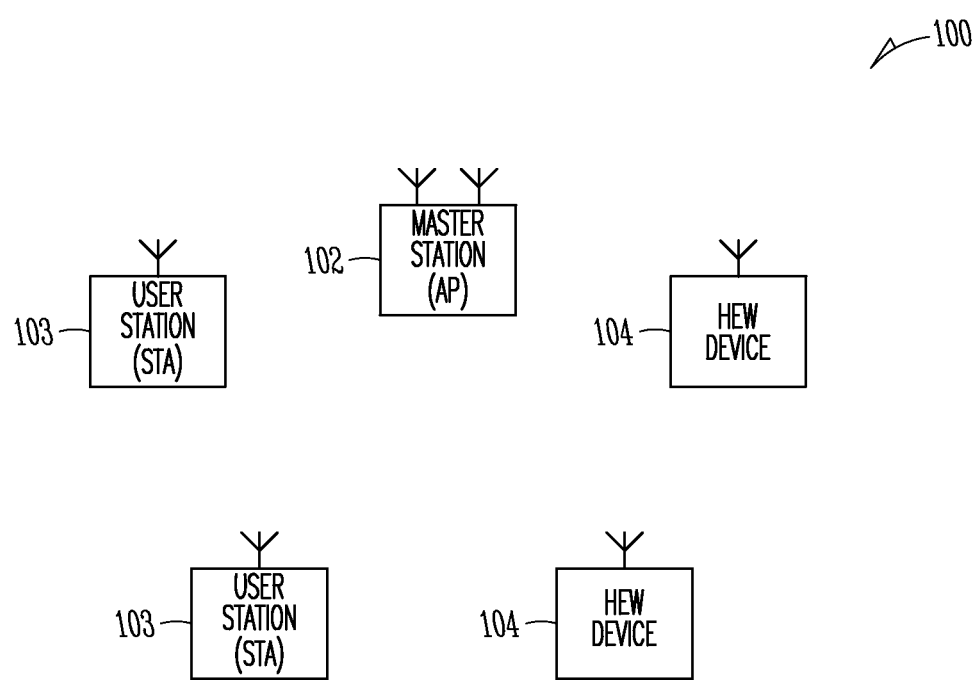
FIG. 1 illustrates a wireless network in accordance with some embodiments.

FIG. 1 illustrates a wireless network in accordance with some embodiments. In some embodiments, the network 100 may be a High Efficiency Wireless Local Area Network (HEW) network. In some embodiments, the network 100 may be a Wireless Local Area Network (WLAN) or a Wi-Fi network. These embodiments are not limiting, however, as some embodiments of the network 100 may include a combination of such networks. That is, the network 100 may support HEW devices in some cases, non HEW devices in some cases, and a combination of HEW devices and non HEW devices in some cases. Accordingly, it is understood that although techniques described herein may refer to either a non HEW device or to an HEW device, such techniques may be applicable to both non HEW devices and HEW devices in some cases.

The network 100 may include a master station (STA) 102, a plurality of user stations (STAs) 103 and a plurality of HEW stations 104 (HEW devices). In some embodiments, the STAs 103 may be legacy stations. These embodiments are not limiting, however, as the STAs 103 may be HEW devices or may support HEW operation in some embodiments. The master station 102 may be arranged to communicate with the STAs 103 and/or the HEW stations 104 in accordance with one or more of the IEEE 802.11 standards. In accordance with some HEW embodiments, an access point may operate as the master station 102 and may be arranged to contend for a wireless medium (e.g., during a contention period) to receive exclusive control of the medium for an HEW control period (i.e., a transmission opportunity (TXOP)). The master station 102 may, for example, transmit a master-sync or control transmission at the beginning of the HEW control period to indicate, among other things, which HEW stations 104 are scheduled for communication during the HEW control period. During the HEW control period, the scheduled HEW stations 104 may communicate with the master station 102 in accordance with a non-contention based multiple access technique. This is unlike conventional Wi-Fi communications in which devices communicate in accordance with a contention-based communication technique, rather than a non-contention based multiple access technique. During the HEW control period, the master station 102 may communicate with HEW stations 104 using one or more HEW frames. During the HEW control period, STAs 103 not operating as HEW devices may refrain from communicating in some cases. In some embodiments, the master-sync transmission may be referred to as a control and schedule transmission.

In some embodiments, the AP 102 may transmit a spatial modulation orthogonal frequency division multiplexing (SM-OFDM) signal that comprises multiple OFDM signals, and the SM-OFDM signal may be received at the STA 103. The SM-OFDM signal may be transmitted in channel resources that comprise multiple sub-carriers and the OFDM signals may be based at least partly on data symbols for used data portions of the sub-carriers. These embodiments will be described in more detail below.

In some embodiments, the multiple-access technique used during the HEW control period may be a scheduled orthogonal frequency division multiple access (OFDMA) technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique including a multi-user (MU) multiple-input multiple-output (MIMO) (MU-MIMO) technique. These multiple-access techniques used during the HEW control period may be configured for uplink or downlink data communications.

The master station 102 may also communicate with STAs 103 and/or other legacy stations in accordance with legacy IEEE 802.11 communication techniques. In some embodiments, the master station 102 may also be configurable to communicate with the HEW stations 104 outside the HEW control period in accordance with legacy IEEE 802.11 communication techniques, although this is not a requirement.

In some embodiments, the HEW communications during the control period may be configurable to use one of 20 MHz, 40 MHz, or 80 MHz contiguous bandwidths or an 80+80 MHz (160 MHz) non-contiguous bandwidth. In some embodiments, a 320 MHz channel width may be used. In some embodiments, subchannel bandwidths less than 20 MHz may also be used. In these embodiments, each channel or subchannel of an HEW communication may be configured for transmitting a number of spatial streams.

In accordance with embodiments, a master station 102 and/or HEW stations 104 may generate an HEW packet in accordance with a short preamble format or a long preamble format. The HEW packet may comprise a legacy signal field (L-SIG) followed by one or more high-efficiency (HE) signal fields (HE-SIG) and an HE long-training field (HE-LTF). For the short preamble format, the fields may be configured for shorter-delay spread channels. For the long preamble format, the fields may be configured for longer-delay spread channels. These embodiments are described in more detail below. It should be noted that the terms "HEW" and "HE" may be used interchangeably and both terms may refer to high-efficiency Wireless Local Area Network operation and/or high-efficiency Wi-Fi operation.

Figure 2:
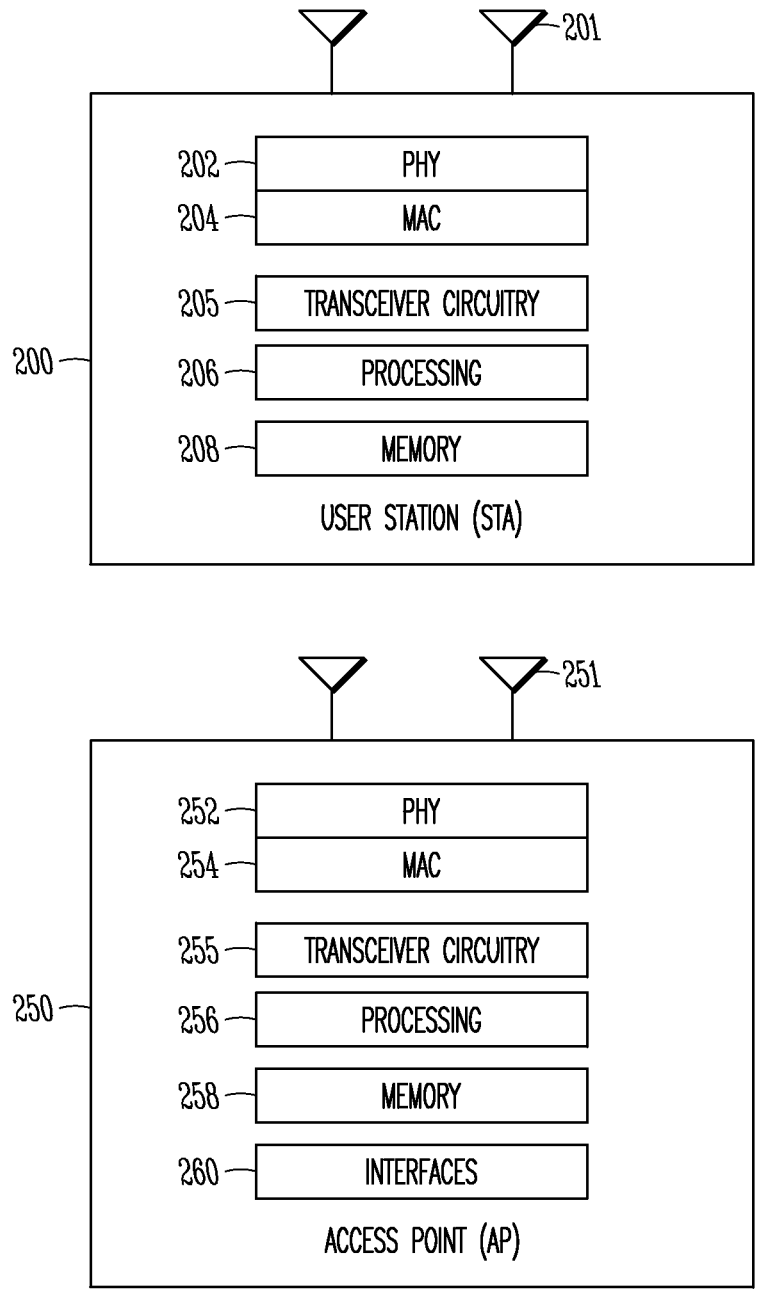
FIG. 2 illustrates a user station (STA) and an access point (AP) in accordance with some embodiments.

FIG. 2 illustrates a user station (STA) and an access point (AP) in accordance with some embodiments. It should be noted that in some embodiments, the AP 102 may be a stationary non-mobile device. The STA 200 may be suitable for use as an STA 103 as depicted in FIG. 1, while the AP 250 may be suitable for use as an AP 102 as depicted in FIG. 1. In addition, the STA 200 may also be suitable for use as an HEW device 104 as shown in FIG. 1, such as an HEW station.

The STA 200 may include physical layer circuitry 202 and a transceiver 205, one or both of which may enable transmission and reception of signals to and from the AP 250, other APs, other STAs or other devices using one or more antennas 201. As an example, the physical layer circuitry 202 may perform various encoding and decoding functions that may include formation of baseband signals for transmission and decoding of received signals. As another example, the transceiver 205 may perform various transmission and reception functions such as conversion of signals between a baseband range and a Radio Frequency (RF) range. Accordingly, the physical layer circuitry 202 and the transceiver 205 may be separate components or may be part of a combined component. In addition, some of the described functionality related to transmission and reception of signals may be performed by a combination that may include one, any or all of the physical layer circuitry 202, the transceiver 205, and other components or layers.

The AP 250 may include physical layer circuitry 252 and a transceiver 255, one or both of which may enable transmission and reception for transmission and reception of signals to and from the STA 200, other APs, other STAs or other devices using one or more antennas 251. The physical layer circuitry 252 and the transceiver 255 may perform various functions similar to those described regarding the STA 200 previously. Accordingly, the physical layer circuitry 252 and the transceiver 255 may be separate components or may be part of a combined component. In addition, some of the described functionality related to transmission and reception of signals may be performed by a combination that may include one, any or all of the physical layer circuitry 252, the transceiver 255, and other components or layers.

The STA 200 may also include medium access control layer (MAC) circuitry 204 for controlling access to the wireless medium, while the AP 250 may also include medium access control layer (MAC) circuitry 254 for controlling access to the wireless medium. The STA 200 may also include processing circuitry 206 and memory 208 arranged to perform the operations described herein. The AP 250 may also include processing circuitry 256 and memory 258 arranged to perform the operations described herein. The AP 250 may also include one or more interfaces 260, which may enable communication with other components, including other APs 102 (FIG. 1). In addition, the interfaces 260 may enable communication with other components that may not be shown in FIG. 1, including components external to the network 100. The interfaces 260 may be wired or wireless or a combination thereof.

The antennas 201, 251 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 201, 251 may be effectively separated to take advantage of spatial diversity and the different channel characteristics that may result.

In some embodiments, the STA 200 or the AP 250 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the STA 200 or AP 250 may be configured to operate in accordance with 802.11 standards, although the scope of the embodiments is not limited in this respect. Mobile devices or other devices in some embodiments may be configured to operate according to other protocols or standards, including other IEEE standards, Third Generation Partnership Project (3GPP) standards or other standards. In some embodiments, the STA 200, AP 250 or other device may include one or more of a keyboard, a display, a non-volatile memory port, multiple antennas, a graphics processor, an application processor, speakers, and other mobile device elements. The display may be an LCD screen including a touch screen.

Although the STA 200 and the AP 250 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the STA 200 and/or AP 250 may include various components of the STA 200 and/or AP 250 as shown in FIG. 2. Accordingly, techniques and operations described herein that refer to the STA 200 (or 103 or 104) may be applicable to an apparatus for an STA. In addition, techniques and operations described herein that refer to the AP 250 (or 102) may be applicable to an apparatus for an AP.

In some embodiments, the STA 200 may be configured as an HEW device 104 (FIG. 1), and may communicate using OFDM communication signals over a multicarrier communication channel. Accordingly, in some cases the STA 200 may be configured to receive signals in accordance with specific communication standards, such as the Institute of Electrical and Electronics Engineers (IEEE) standards including IEEE 802.11-2012, 802.11n-2009 and/or 802.11ac-2013 standards and/or proposed specifications for WLANs including proposed HEW standards, although the scope of the invention is not limited in this respect as they may also be suitable to transmit and/or receive communications in accordance with other techniques and standards. In some other embodiments, the STA 200 configured as an HEW device 104 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

Embodiments disclosed herein provide two preamble formats for High Efficiency (HE) Wireless LAN standards specification that is under development in the IEEE Task Group 11ax (TGax).

In accordance with embodiments, the AP 102 may transmit an SM-OFDM signal that comprises multiple OFDM signals, and the SM-OFDM signal may be received at the STA 103. The SM-OFDM signal may be transmitted in channel resources that comprise multiple sub-carriers and the OFDM signals may be based at least partly on data symbols for used data portions of the sub-carriers. The used data portions may be based on a first portion of encoded bits and the data symbols for the used data portions may be based on a second portion of the encoded bits. In some examples, the used data portions of the sub-carriers may be different for at least some of the OFDM signals. These embodiments will be described in more detail below.

In some embodiments, the channel resources may be used for downlink transmission by the AP 102 and for uplink transmissions by the STAs 103. That is, a time-division duplex (TDD) format may be used. In some cases, the channel resources may include multiple channels, such as the 20 MHz channels previously described. The channels may include multiple sub-channels or may be divided into multiple sub-channels for the uplink transmissions to accommodate multiple access for multiple STAs 103. The downlink transmissions may or may not utilize the same format.

In some embodiments, the downlink sub-channels may comprise a predetermined bandwidth. As a non-limiting example, the sub-channels may each span 2.03125 MHz, the channel may span 20 MHz, and the channel may include eight or nine sub-channels. Although reference may be made to a sub-channel of 2.03125 MHz for illustrative purposes, embodiments are not limited to this example value, and any suitable frequency span for the sub-channels may be used. In some embodiments, the frequency span for the sub-channel may be based on a value included in an 802.11 standard (such as 802.11ax), a 3GPP standard or other standard.

In some embodiments, the sub-channels may comprise multiple sub-carriers. Although not limited as such, the sub-carriers may be used for transmission and/or reception of OFDM or OFDMA signals. As an example, each sub-channel may include a group of contiguous sub-carriers spaced apart by a pre-determined sub-carrier spacing. As another example, each sub-channel may include a group of non-contiguous sub-carriers. That is, the channel may be divided into a set of contiguous sub-carriers spaced apart by the pre-determined sub-carrier spacing, and each sub-channel may include a distributed or interleaved subset of those sub-carriers. The sub-carrier spacing may take a value such as 78.125 kHz, 312.5 kHz or 15 kHz, although these example values are not limiting. Other suitable values that may or may not be part of an 802.11 or 3GPP standard or other standard may also be used in some cases. As an example, for a 78.125 kHz sub-carrier spacing, a sub-channel may comprise 26 contiguous sub-carriers or a bandwidth of 2.03125 MHz.

Figure 3:
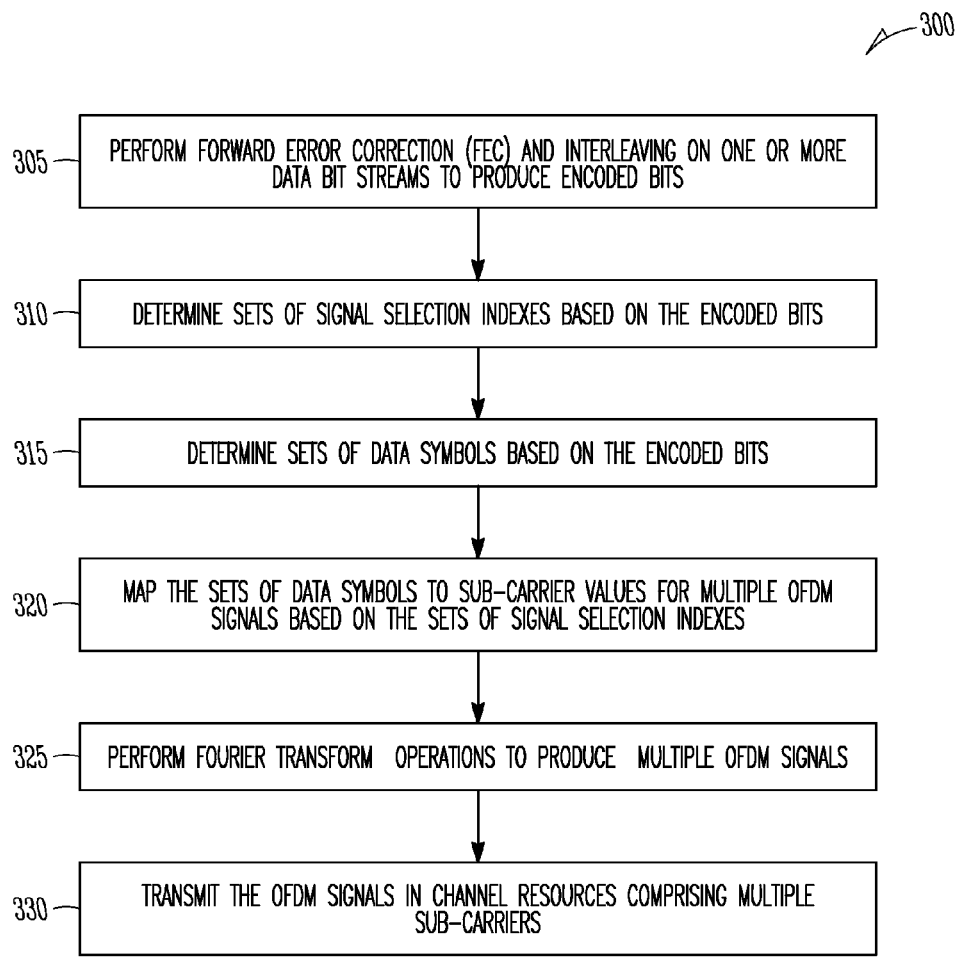
FIG. 3 illustrates the operation of a method of spatial modulation orthogonal frequency division multiplexing (SM-OFDM) communication in accordance with some embodiments.

FIG. 3 illustrates the operation of a method of spatial modulation orthogonal frequency division multiplexing (SM-OFDM) communication in accordance with some embodiments. It is important to note that embodiments of the method 300 may include additional or even fewer operations or processes in comparison to what is illustrated in FIG. 3. In addition, embodiments of the method 300 are not necessarily limited to the chronological order that is shown in FIG. 3. In describing the method 300, reference may be made to FIGS. 1-2 and 4-7, although it is understood that the method 300 may be practiced with any other suitable systems, interfaces and components.

In addition, while the method 300 and other methods described herein may refer to STAs 103 and APs 102 operating in accordance with 802.11 or other standards, embodiments of those methods are not limited to just those devices and may also be practiced on other mobile devices, such as an HEW STA, an HEW AP, an Evolved Node-B (eNB) or User Equipment (UE). In some embodiments, the STA 103 described in the method 300 may be an HEW STA 103 while the AP 102 may be an HEW AP 102. The method 300 and other methods described herein may also be practiced by wireless devices configured to operate in other suitable types of wireless communication systems, including systems configured to operate according to various Third Generation Partnership Project (3GPP) Long Term Evolution (LTE) standards. The method 300 may also refer to an apparatus for an STA 103 and/or AP 102 or other device described above.

At operation 305 of the method 300, the AP 102 may perform various encoder operations that may include any or all of forward error correction (FEC), interleaving, scrambling or others. As an example, data bits (or information bits) may be encoded by an FEC encoder to produce coded bits, which may be interleaved, parsed, divided, grouped or arranged in some manner to produce a group of "encoded bits." In some cases, a bit parser may further be used to produce multiple groups of encoded bits. Examples of such will be described in more detail below. In some embodiments, the data bits and the encoded bits may take values of "0" or "1."

Figure 4:
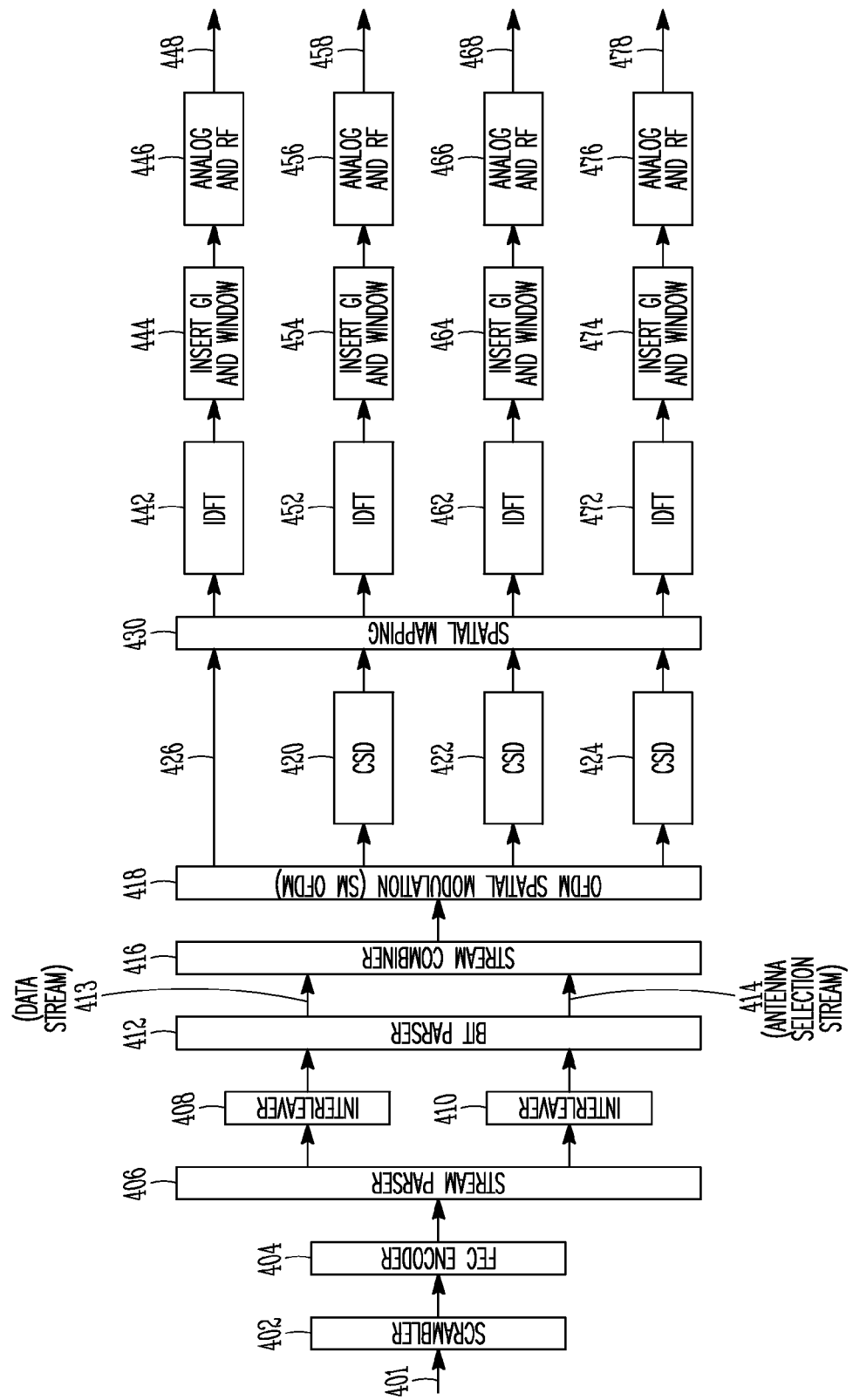
FIG. 4 illustrates an example block diagram for an OFDM transmitter in accordance with some embodiments.

FIG. 4 illustrates an example block diagram for an OFDM transmitter in accordance with some embodiments. It should be noted that the example OFDM transmitter 400 may serve to illustrate some or all of the concepts and techniques described herein, but embodiments are not limited to the example OFDM transmitter 400. For instance, embodiments are not limited to the number of transmit paths shown, and are also not limited to the number or type of blocks. Embodiments are also not limited to the ordering or arrangement of the blocks as shown in FIG. 4. It should also be noted that some embodiments may include fewer blocks than what is shown in FIG. 4. Some embodiments may include additional blocks or other elements not shown in FIG. 4. In addition, some embodiments may use different implementations than what is shown in FIG. 4 for performance of the same or similar functionality. For instance, combined functionality of multiple blocks shown in FIG. 4 may be implemented, in some cases, using fewer or different blocks.

One or more data bit streams 401 may be input for processing by encoder blocks such as the scrambler 402, the FEC encoder 404, and the stream parser 406, which may divide or group the output of the FEC encoder 404 into multiple streams (two in the example of FIG. 4) for input to one or more interleavers 408, 410. It should be noted that embodiments are not limited to the use of interleaving by the interleavers 408, 410 or other components. That is, some embodiments may use interleaving while other embodiments may refrain from the use of interleaving. Whether or not interleaving is used may depend at least partly on an FEC type as used in blocks such as the FEC encoder 404 or others. For instance, arrangements in which binary convolutional codes (BCC) are used may or may not use interleaving. However, arrangements in which low density parity check (LDPC) codes are used may refrain from the use of interleaving, in some cases. Referring to the block diagram in FIG. 4, some embodiments may exclude the interleavers 408, 410. As a non-limiting example, the outputs from the stream parser 406 and/or FEC encoder 404 may be passed to the bit parser 412 when interleaving is excluded.

Returning to the method 300, at operation 310, sets of signal selection indexes may be determined based on the encoded bits. At operation 315, sets of data symbols may be determined based on the encoded bits. It should be noted that embodiments are not limited to sets of multiple data symbols, as sets of one or more data symbols may be used in some cases. As a non-limiting example, a bit parser or similar may operate on interleaver outputs to produce two groups of encoded bits or bit streams for use as part of operations 310-315. For instance, a "selection group" of bits, an "antenna selection" group of bits, an antenna selection stream or similar may be used for operation 310. A "modulation group" of bits or a "data stream" or similar may be used for operation 315. As noted above, interleaving may be excluded in some embodiments. Accordingly, some of the techniques described herein that refer to interleaver outputs may also be applied using other outputs, such as those from the FEC encoder 404 and/or stream parser 406. That is, some or all of the described operations that are performed on the interleaver outputs may be performed on other outputs in those embodiments.

Referring back to the example OFDM transmitter 400 in FIG. 4, the bit parser 412 may perform reordering and rearrangement operations on the outputs of the interleavers 408, 410 to form multiple data streams or multiple groups of encoded bits. For instance, the data stream 413 and antenna selection stream 414 may be formed. The stream combiner 416 may further rearrange or reorder the streams 413, 414 into a more suitable format for implementation or other purposes.

As an example, of the number of transmit antennas Nt that are available, a number Nact of them may be active per sub-carrier. Accordingly, an active transmit antenna index n may be formed as $$n = \left\lfloor \log 2\left(\binom{Nt}{Nact}\right)\right\rfloor_2$$

In the above, the $\lfloor \bullet \rfloor_2$ operation represents flooring to the nearest integer that is a power of two, while the argument of the log 2( ) operation represents the number of possible combinations of the Nt antennas taken Nact at a time. The value n may be the number of bits used for antenna selection as described herein.

It should be noted that a transmit antenna may be considered "active" for a particular sub-carrier during an OFDM symbol period when a signal is present for the transmit antenna on the sub-carrier during the OFDM symbol period. Accordingly, the transmit antenna may be considered "inactive" or "not active" for other sub-carriers in the same OFDM symbol period when no signal is present for the transmit antenna for those sub-carriers in the OFDM symbol period. That is, a transmit antenna may be considered active for some of the sub-carriers and inactive for other sub-carriers.

Figure 5:
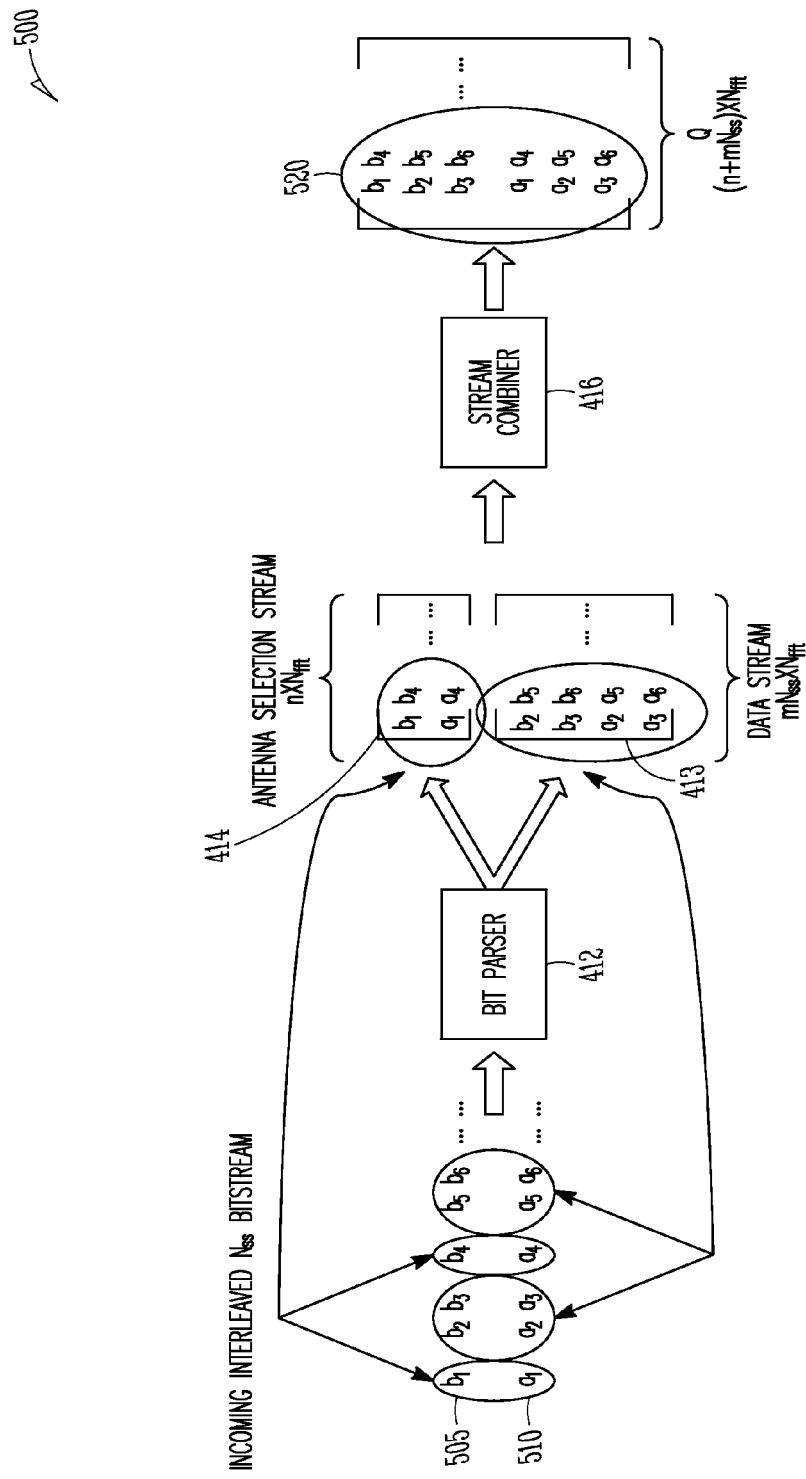
FIG. 5 illustrates an example of a bit parser and a stream combiner in accordance with some embodiments.

FIG. 5 illustrates an example of a bit parser and a stream combiner in accordance with some embodiments. It should be noted that embodiments are not limited to the illustrated functionality of the bit parser 412 and the stream combiner 416 in the example. Embodiments are also not limited to the number of bit streams shown in the example of FIG. 5, in which a first input bit stream 505 (labeled b1, b2, . . . b6) and a second bit stream 510 (labeled a1, a2, . . . a6) are used. In the non-limiting example shown, a number of incoming bit streams (two) is equal to the number of active transmit antennas Nact, while the number of antennas is equal to four.

The bit parser 412 may produce the antenna selection stream 414, which is shown in a matrix format with dimension (n×N_FFT). In addition, the data stream 413, shown with dimension (m*N_ss×N_FFT), may also be produced by the bit parser 412. The stream combiner 416 may produce the matrix 520 (labeled as "Q") of dimension (n+m*N_SS)× (N_FFT), which may be in a suitable format for implementation of subsequent operations. As previously described, the formation of the matrix 520 based on the incoming bit streams 505, 510 may also be performed using implementations other than what is shown in FIG. 5. For instance, fewer blocks, more blocks or different blocks may be used.

Returning to the method 300, the sets of data symbols may be mapped to sub-carrier values for multiple OFDM signals based on the sets of signal selection indexes at operation 320. It should be noted that embodiments are not limited to multiple OFDM signals, as one or more OFDM signals may be used in some cases. At operation 325, one or more Fourier Transform operations, such as an Inverse Fast Fourier Transform (IFFT), may be performed to produce the multiple OFDM signals. The OFDM signals may be transmitted in channel resources comprising multiple sub-carriers at operation 330. It should be noted that other operations may be performed, such as up-sampling of the IFFT outputs to a higher sampling rate and addition of guard intervals and guard bands.

The OFDM signals may be based on data symbols, pilot symbols, zero values (intentionally set) or other values that are mapped to different sub-carrier locations. In some embodiments, the OFDM signals may be based at least partly on data symbols for used data portions of the sub-carriers. The used data portions may be based on a first portion of encoded bits, such as the selection group of bits or the antenna selection stream described previously. The data symbols for the used data portions may be based on a second portion of the encoded bits. For instance, the modulation group of bits or the data stream described previously may be used.

As an example, each OFDM signal may be based on a particular used data portion of the sub-carriers, and the used data portion for each OFDM signal may be different. That is, of the set of data sub-carriers available to a particular OFDM signal, only a portion of those data sub-carriers may be "used," or populated with data symbols. The remaining data sub-carriers may be "unused," and therefore mapped to a value of zero, or "stuffed" with zero. The portion of data sub-carriers that are used, or populated with data symbols, may be different for each OFDM signal, and may be based at least partly on the selection group of bits. In addition, the modulation group of bits (or the sets of data symbols, which are based on the modulation group of bits) may be used to populate the used data portions.

As another example, for a first data sub-carrier, a first set of signal selection indexes may be used to determine a first sub-set of the OFDM signals that are to be populated with data symbols or "used." The remaining OFDM signals may be considered "unused" for the first data sub-carrier, and may be populated with a value of zero. For a second data sub-carrier, a second set of signal selection indexes may be used to determine a second sub-set of the OFDM signals that are to be populated with data symbols with the remaining OFDM signals populated with a value of zero. The first and second sets of signal selection indexes, and therefore the first and second sub-sets of used OFDM signals, may be different in some cases. It should be noted that because the sets of signal selection indexes may be formed from the selection group of bits or antenna stream, the determination of which OFDM signals are used for a particular sub-carrier may be based on the selection group of bits. In addition, a first set of data symbols may be used to populate the used OFDM signals for the first sub-carrier, while a second set of data symbols may be used to populate the used OFDM signals for the second sub-carrier.

In some embodiments, the sub-carriers may include a group of data sub-carriers and a group of pilot sub-carriers. The pilot sub-carriers may be mapped to known or predetermined values to enable channel estimation or other receiver functions. As a non-limiting example, binary phase shift keying (BPSK) symbols selected from +1 and −1 may be used in the pilot sub-carriers. In addition, some of the sub-carriers, such as a direct current (DC) sub-carrier and one or more guard-band sub-carriers, may be populated with a value of zero.

It should also be noted that the described techniques for producing the SM-OFDM signal and OFDM signals may be related to a symbol period, which may be related inversely to a sub-carrier spacing for OFDM. A guard interval (such as a cyclic prefix) may also increment the symbol period. Embodiments are not limited in terms of the number of symbol periods, however, as the SM-OFDM signals and OFDM signals may include multiple symbol periods. As an example, a first set of input bits may be used to produce the SM-OFDM signal for a first symbol period.

It should be noted that the use of zero in the unused sub-carriers here may include the use of the numerical value of 0.0 for the sub-carrier before input to the IFFT operation, in contrast to the use of some type of logical zero. Accordingly, in this example, for each data sub-carrier, the OFDM signals may be divided into a first group (used sub-set) for which the sub-carrier is mapped to one or more data symbols and a second group (unused sub-set) for which the sub-carrier is mapped to a value of zero.

It should also be noted that the sets of data symbols may be mapped to constellation points using any suitable technique. Various modulation types, such as BPSK, QPSK, QAM and others may be used, and may be defined by a mapping of bits to symbols. For instance, m bits may be mapped to a constellation with $M=2^m$ possible symbols.

Figure 6:
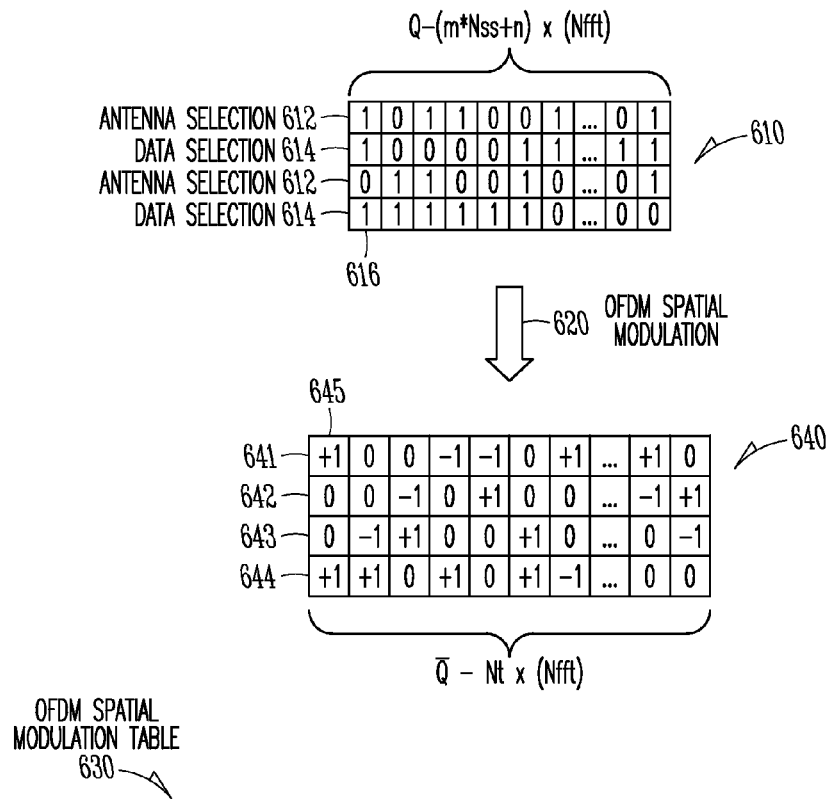
FIG. 6 illustrates an example of SM-OFDM operation in accordance with some embodiments.

FIG. 6 illustrates an example of SM-OFDM operation in accordance with some embodiments. It should be noted that embodiments are not limited to the illustrated functionality of the OFDM spatial modulation block 418 in the example. Embodiments are also not limited to the number of bit streams shown in the example of FIG. 6. In addition, the example in FIG. 6 uses BPSK modulation with constellation points selected from values of +1 and −1, but embodiments are not limited to this type of modulation or constellation.

An OFDM signal may be formed by an IFFT (or other Fourier Transform operation) that is based on a number Nfft of points. In some embodiments, Nfft may be a power of two. Accordingly, the matrix 610 (which is labeled as "Q" and may be similar to or the same as the matrix 520 of FIG. 5) of dimension (m*Nss+n)×(Nfft) may include the antenna selection stream 612 and the data selection stream 614, which populate the rows of the matrix 610. Each column of the matrix 610 may represent a sub-carrier. As an example, sub-carrier 616 will be based on the values (1, 1, 0, 1) in the first column in the operations below.

The OFDM spatial modulation 620 may be performed on the matrix 610 to produce the matrix 640 (labeled as "Q̄"). Each row of the matrix 640 may represent values for the Nfft sub-carriers in an OFDM signal to be transmitted on a particular transmit antenna, and each OFDM signal (in the time domain) may be formed by an IFFT of the row. For the example shown in FIG. 6, four OFDM signals may be used, and each row labeled 641-644 may represent one of those OFDM signals. Each column may represent a sub-carrier. Accordingly, the dimensions of the matrix 640 may be (Nt)×(Nfft), where Nt is the number of transmit antennas used (or the number of OFDM signals).

The OFDM spatial modulation 620 may be performed using the OFDM spatial modulation table 630. It should be noted that embodiments are not limited to the use of the table 630, as other implementations may perform the same or similar functionality. The rows of the table 630 illustrate the 16 possible combinations of the four bits 631-634, along with the two bits (taken from the four bits) that form the antenna selection bits 635 for each row. The corresponding combination of antennas is shown in column 636 and the corresponding four values to be placed on the particular sub-carrier for the four OFDM signals is shown in column 637. It should be noted that modulated symbols take the values of +1 or −1 for BPSK, so each set of four values for the sub-carriers has two BPSK constellation points of +1 or −1 and has two values of zero (for the unused OFDM signals for that particular sub-carrier).

Accordingly, for each sub-carrier, the four bit values in the matrix 610 may be mapped to the sub-carrier values in column 637 to produce the four sub-carrier values for the OFDM signals. As an example, the sub-carrier 616 is mapped to row 638 of the table 630, and the sub-carrier values of (+1, 0, 0, +1) are shown in column 645.

Returning to the example OFDM transmitter 400 in FIG. 4, the matrix 640 may include mappings of data points and zero values for a number of OFDM signals, four in this example. The rows of matrix 640 may be the outputs of the SM-OFDM block 418, which may be passed through various blocks shown in FIG. 4 to produce OFDM signals at RF, labeled as 448, 458, 468, and 478.

Figure 7:
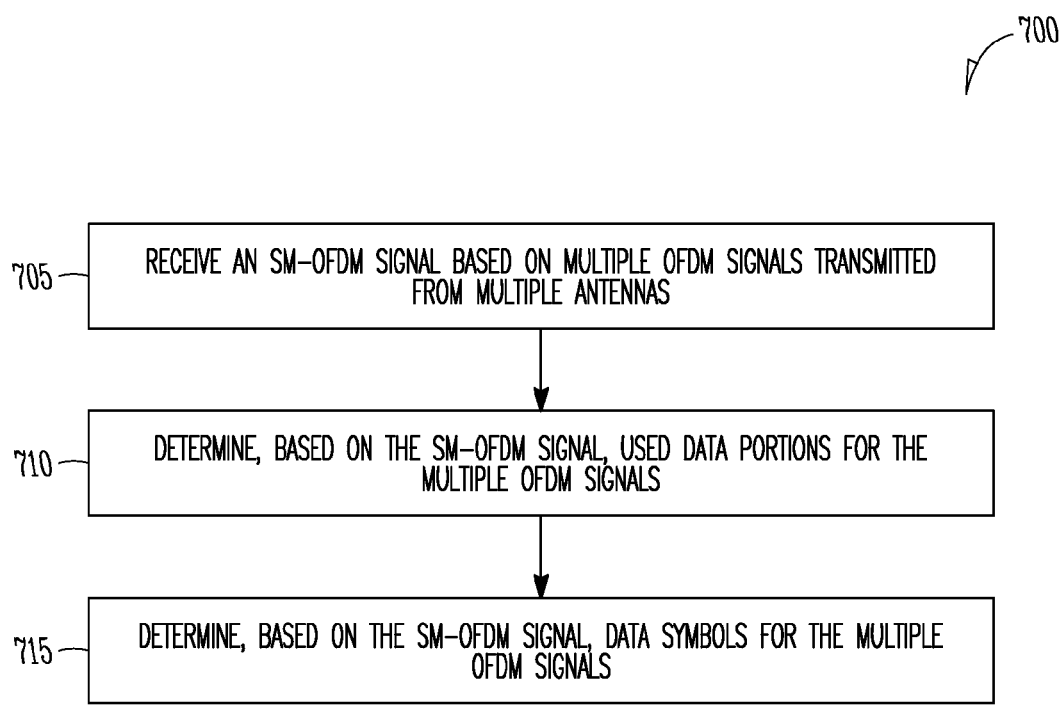
FIG. 7 illustrates the operation of another method of SM-OFDM communication in accordance with some embodiments.

FIG. 7 illustrates the operation of another method of SM-OFDM communication in accordance with some embodiments. As mentioned previously regarding the method 300, embodiments of the method 700 may include additional or even fewer operations or processes in comparison to what is illustrated in FIG. 7 and embodiments of the method 700 are not necessarily limited to the chronological order that is shown in FIG. 7. In describing the method 700, reference may be made to FIGS. 1-6, although it is understood that the method 700 may be practiced with any other suitable systems, interfaces and components. In addition, embodiments of the method 700 may refer to APs, STAs, eNBs 104, UEs 102, HEW APs, HEW STAs or other wireless or mobile devices. The method 700 may also refer to an apparatus for an STA 103 and/or AP 102 or other device described above.

It should be noted that the method 700 may be practiced at an STA 103, and may include exchanging of signals or messages with an AP 102. Similarly, the method 300 may be practiced at the AP 102, and may include exchanging of signals or messages with the STA 103. In some cases, operations and techniques described as part of the method 300 may be relevant to the method 700. In addition, embodiments may include operations performed at the STA 103 that are reciprocal or similar to other operations described herein performed at the AP 102. For instance, an operation of the method 700 may include reception of a frame by the STA 103 while an operation of the method 300 may include transmission of the same frame or similar frame by the AP 102.

In addition, previous discussion of various techniques and concepts may be applicable to the method 700 in some cases, including the SM-OFDM signal, data sub-carriers, pilot sub-carriers, antenna selection bits, data selection bits, and others. Other concepts previously described, such as the channel resources, sub-channels, and sub-carriers may also be applicable to the method 700. In addition, the example OFDM transmitter 400 shown in FIG. 4 may also be applicable, in some cases.

At operation 705, the STA 103 may receive an SM-OFDM signal during in channel resources comprising multiple sub-carriers. In some embodiments, the OFDM signals may be based at least partly on data symbols for used data portions of the sub-carriers. In such embodiments, the used data portions may be based on a first portion of encoded bits and the data symbols for the used data portions may be based on a second portion of the encoded bits. The used data portions may be different for at least some of the OFDM signals, in some cases. Accordingly, the OFDM signals previously described regarding the method 300 may be used in some embodiments.

In some embodiments, the STA 103 may receive the SM-OFDM signal on one receive antenna. Embodiments are not limited to reception with a single antenna, however, and multiple receive antennas may be used in some embodiments. The SM-OFDM signal may be based on multiple OFDM signals transmitted from a number Nt of transmit antennas at the AP 102 and may be received on a number Nr of receive antennas at the STA 103. As a non-limiting example, when Nt is larger than Nr, the configuration may be referred to as "over-determined" or similar. As another non-limiting example, a configuration may be considered over-determined when Nt is significantly larger than Nr. For instance, four or more transmit antennas may be used at the AP 102 to send OFDM signals for reception at one receive antenna at the STA 103, which may be considered an over-determined configuration.

Such reception by a single receive antenna or by a relatively small number of receive antennas at the STA 103 may be performed when the STA 103 is limited in terms of size and/or cost in some cases. The STA 103 may have been designed accordingly for reception by a single receive antenna or by a small number of antennas. For example, the STA 103 may be an Machine Type Communication (MTC) device or an Internet-of-Things (IoT) device. As another example, the STA 103 may be configured to operate as an MTC device or IoT device. The scope of embodiments is not limited by these examples, however, as reception using a small number of antennas is not limited to MTC or IoT operation or devices. In addition, reception in an over-determined configuration is also not limited to MTC or IoT operation or devices.

At operation 710, the STA 103 may determine, based on the SM-OFDM signal, the used data portions. The data symbols may be determined based on the SM-OFDM signal at operation 715. It should be noted that these operations may be performed separately or jointly, and may use any suitable technique such as maximum likelihood (ML), minimum mean-squared error (MMSE) or others. In addition, the STA 103 may form a channel estimate for each of the OFDM signals (transmit antennas), although some of the signals may not be active for all of the data sub-carriers. Accordingly, pilot symbols may be used for the transmit antennas in some cases. As an example, sub-carrier positions or indexes for the pilot symbols may be predetermined. As another example, the positions may be fixed for one or more OFDM symbols, but are not limited as such, as the positions may be variable in some cases. Accordingly, embodiments are not limited to stationary assignments of the sub-carrier positions for the pilot symbols.

An example of an apparatus for an access point (AP) is disclosed herein. The apparatus may comprise transceiver circuitry and hardware processing circuitry. The hardware processing circuitry may configure the transceiver circuitry to transmit a spatial modulation orthogonal frequency division multiplexing (SM-OFDM) signal comprising multiple OFDM signals. The SM-OFDM signal may be transmitted in channel resources comprising multiple sub-carriers. The OFDM signals may be based at least partly on one or more data symbols for used data portions of the sub-carriers. The used data portions may be based on a first portion of encoded bits and the data symbols for the used data portions may be based on a second portion of the encoded bits. In some examples, the used data portions of the sub-carriers may be different for at least some of the OFDM signals.

In some examples, the sub-carriers may include a group of data sub-carriers and a group of pilot sub-carriers. The group of data sub-carriers may comprise a used data portion and an unused data portion for each OFDM signal. The OFDM signals may be based on one or more Fourier Transform operations in which the sub-carriers in the used data portions are populated with data symbols and the sub-carriers in the unused data portions are populated with a value of zero. In some examples, the sub-carriers may include a group of data sub-carriers and a group of pilot sub-carriers. For each data sub-carrier, the OFDM signals may be divided into a first group for which the sub-carrier is mapped to one or more data symbols and a second group for which the sub-carrier is mapped to a value of zero. The division may be based at least partly on the first portion of the encoded bits.

In some examples, the OFDM signals may be based on Fourier Transform operations that use the mappings for the data sub-carriers. In some examples, each OFDM signal may be based at least partly on one of the used data portions of the sub-carriers and at least some of the used data portions of the sub-carriers may be different. In some examples, the hardware processing circuitry may be further configured to perform forward error correction (FEC) and interleaving on one or more data bit streams to produce the encoded bits. In some examples, the hardware processing circuitry may be further configured to divide the encoded bits into a selection group of bits for determination of the used data portions and a modulation group of bits for determination of the data symbols.

In some examples, the apparatus may further include multiple antennas coupled to the transceiver circuitry for transmission of the SM-OFDM signal in accordance with a multiple input multiple output (MIMO) technique. Each OFDM signal of the SM-OFDM signal may be transmitted on a different antenna. In some examples, the apparatus may be further configured to operate according to a wireless local area network (WLAN) protocol.

An example of a non-transitory computer-readable storage medium that stores instructions for execution by one or more processors of an access point (AP) to perform operations communication is also disclosed herein. The operations may configure the one or more processors to encode a group of data bits to produce a first group of encoded bits and a second group of encoded bits. The operations may further configure the one or more processors to determine sets of signal selection indexes based on the first group of encoded bits and further determine sets of data symbols based on the second group of encoded bits. The operations may further configure the one or more processors to transmit a spatial modulation orthogonal frequency division multiplexing (SM-OFDM) signal comprising multiple OFDM signals, the SM-OFDM signal transmitted in channel resources that include multiple data sub-carriers. For a first data sub-carrier, a first set of signal selection indexes may indicate a first used portion of the OFDM signals to be mapped to a first set of data symbols.

In some examples, for the first data sub-carrier, a first unused portion of the OFDM signals may be mapped to a value of zero. In some examples, for a second data sub-carrier, a second set of signal selection indexes may indicate a second used portion of the OFDM signals to be mapped to a second set of data symbols. The second set of signal selection indexes may be different from the first set of signal selection indexes. In some examples, the channel resources may further include multiple pilot sub-carriers for which at least a portion of the OFDM signals are mapped to pilot symbols. In some examples, the AP may be configured to operate according to a wireless local area network (WLAN) protocol.

An example of a method of communication performed at an access point (AP) is also disclosed herein. The method may comprise transmitting a spatial modulation orthogonal frequency division multiplexing (SM-OFDM) signal comprising multiple OFDM signals. The SM-OFDM signal may be transmitted in channel resources comprising multiple sub-carriers. The OFDM signals may be based at least partly on data symbols for used data portions of the sub-carriers. The used data portions may be based on a first portion of encoded bits and the data symbols for the used data portions may be based on a second portion of the encoded bits. In some examples, the used data portions of the sub-carriers may be different for at least some of the OFDM signals.

An example of an apparatus for a user station (STA) is also disclosed herein. The apparatus may comprise transceiver circuitry and hardware processing circuitry. The hardware processing circuitry may configure the transceiver circuitry to receive a spatial modulation orthogonal frequency division multiplexing (SM-OFDM) signal in channel resources comprising multiple sub-carriers. The SM-OFDM signal may be based on multiple OFDM signals transmitted from multiple antennas. The OFDM signals may be based at least partly on data symbols for used data portions of the sub-carriers. The used data portions may be based on a first portion of encoded bits and the data symbols for the used data portions may be based on a second portion of the encoded bits.

In some examples, the hardware processing circuitry may be configured to determine, based on the SM-OFDM signal, the used data portions and the data symbols. The used data portions of the sub-carriers may be different for at least some of the OFDM signals. In some examples, the apparatus may further comprise an antenna coupled to the transceiver circuitry for the reception of the SM-OFDM signal. In some examples, the apparatus may be a single antenna apparatus. In some examples, the STA may be configured to operate according to a wireless local area network (WLAN) protocol.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for an access point (AP), the apparatus comprising transceiver circuitry and hardware processing circuitry, the hardware processing circuitry to parse a data stream of encoded bits to generate a first portion of the encoded bits that is indicative of a transmit antenna index and a second portion of the encoded bits that is indicative of a data selection index, and configure the transceiver circuitry to:

transmit a spatial modulation orthogonal frequency division multiplexing (SM-OFDM) signal comprising multiple OFDM signals, the SM-OFDM signal transmitted via transmit antennas selected based on the transmit antenna index, in channel resources comprising multiple sub-carriers, each sub-carrier of the multiple sub-carriers comprising a used data portion and an unused data portion;

wherein the OFDM signals are based at least partly on one or more data symbols transmitted via the used data portions of the multiple sub-carriers, wherein the used data portions for each sub-carrier of the multiple sub-carriers are determined based on the first portion of the encoded bits, and wherein the one or more data symbols for the used data portions are determined based on the second portion of the encoded bits.

2. The apparatus according to claim 1, wherein the used data portions of the sub-carriers are different for at least some of the OFDM signals.

3. The apparatus according to claim 2, wherein:
the group of data sub-carriers comprises the used data portion and an unused data portion for each OFDM signal, and
the OFDM signals are based on Fourier Transform operations in which the sub-carriers in the used data portions are populated with data symbols and the sub-carriers in the unused data portions are populated with a value of zero.

4. The apparatus according to claim 2, wherein:
the sub-carriers include a group of data sub-carriers and a group of pilot sub-carriers,
for each data sub-carrier, the OFDM signals are divided into a first group for which the sub-carrier is mapped to one or more data symbols and a second group for which the sub-carrier is mapped to a value of zero, the division based at least partly on the first portion of the encoded bits.

5. The apparatus according to claim 4, wherein the OFDM signals are based on one or more Fourier Transform operations that use the mappings for the data sub-carriers.

6. The apparatus according to claim 1, wherein each OFDM signal is based at least partly on one of the used data portions of the sub-carriers and at least some of the used data portions of the sub-carriers are different.

7. The apparatus according to claim 1, the hardware processing circuitry configured to perform forward error correction (FEC) and interleaving on one or more data bit streams to produce the encoded bits.

8. The apparatus according to claim 7, the hardware processing circuitry further configured to divide the encoded bits into a selection group of bits for determination of the used data portions and a modulation group of bits for determination of the data symbols.

9. The apparatus according to claim 1, wherein:
the apparatus further includes multiple antennas coupled to the transceiver circuitry for transmission of the SM-OFDM signal in accordance with a multiple input multiple output (MIMO) technique, and
each OFDM signal of the SM-OFDM signal is transmitted on a different antenna.

10. The apparatus according to claim 1, the apparatus further configured to operate according to a wireless local area network (WLAN) protocol.

11. A non-transitory computer-readable storage medium that stores instructions for execution by one or more processors of an access point (AP) to perform operations, the operations to configure the one or more processors to:

encode a group of data bits to produce a first group of encoded bits and a second group of encoded bits;

determine sets of signal selection indexes based on the first group of encoded bits and further determine sets of data symbols based on the second group of encoded bits; and transmit a spatial modulation orthogonal frequency division multiplexing (SM-OFDM) signal comprising multiple OFDM signals, the SM-OFDM signal transmitted based on the signal selection indexes in channel resources that include multiple data sub-carriers, the multiple sub-carriers including a group of data sub-carriers and a group of pilot sub-carriers, each sub-carrier of the multiple data sub-carriers comprising a used data portion and an unused data portion, wherein, for a first data sub-carrier of the group of data subcarriers, a first set of the sets of signal selection indexes indicates a first used portion associated with a data sub-carrier of the OFDM signals to be mapped to a first set of the sets of data symbols.

12. The non-transitory computer-readable storage medium according to claim 11, wherein, for the first data sub-carrier, a first unused portion of the OFDM signals is mapped to a value of zero.

13. The non-transitory computer-readable storage medium according to claim 11, wherein:
for a second data sub-carrier, a second set of signal selection indexes indicates a second used portion of the OFDM signals to be mapped to a second set of data symbols, and
the second set of signal selection indexes is different from the first set of signal selection indexes.

14. The non-transitory computer-readable storage medium according to claim 11, wherein the channel resources further include multiple pilot sub-carriers for which at least a portion of the OFDM signals are mapped to pilot symbols.

15. The non-transitory computer-readable storage medium according to claim 11, wherein the AP is configured to operate according to a wireless local area network (WLAN) protocol.

16. A method of communication performed at an access point (AP), the method comprising:
parsing a data stream of encoded bits to generate a first portion of the encoded bits that is indicative of a transmit antenna index and a second portion of the encoded bits that is indicative of a data selection index; and transmitting based on the transmit antenna index, a spatial modulation orthogonal frequency division multiplexing (SM-OFDM) signal comprising multiple OFDM signals corresponding to the encoded bits, the SM-OFDM signal transmitted in channel resources comprising multiple sub-carriers, the multiple sub-carriers including a group of data sub-carriers and a group of pilot sub-carriers, each sub-carrier of the data sub-carriers comprising a used data portion and an unused data portion;

wherein the OFDM signals are based at least partly on data symbols transmitted via the used data portions of the data sub-carriers, wherein the used data portions for each sub-carrier of the data sub-carriers are selected based on ti first portion of the encoded bits, and wherein the data symbols for the used data portions are selected based on the second portion of the encoded bits.

17. The method according to claim 16, wherein the used data portions of the sub-carriers are different for at least some of the OFDM signals.

18. An apparatus for a user station (STA), the apparatus comprising transceiver circuitry and hardware processing circuitry, the hardware processing circuitry to configure the transceiver circuitry to:

receive a spatial modulation orthogonal frequency division multiplexing (SM-OFDM) signal in channel resources comprising multiple sub-carriers, the SM-OFDM signal based on multiple OFDM signals corresponding to encoded bits and transmitted from multiple antennas, the multiple sub-carriers including a group of data sub-carriers; and determine, based on the SM-OFDM signal, used data portions of the group of data sub-carriers, wherein the used data portions are different for at least some of the OFDM signals;

wherein the OFDM signals are based at least partly on data symbols transmitted via the used data portions of the group of data sub-carriers, wherein the used data portions are based on a first portion of the encoded bits, wherein the first portion of the encoded bits further indicates a transmit antenna index for the multiple antennas, and wherein the data symbols for the used data portions are based on a second portion of the encoded bits.

19. The apparatus according to claim 18, the apparatus further comprising an antenna coupled to the transceiver circuitry for the reception of the SM-OFDM signal.

20. The apparatus according to claim 19, wherein the apparatus is a single antenna apparatus.

21. The apparatus according to claim 18, wherein the STA is configured to operate according to a wireless local area network (WLAN) protocol.

* * * * *

UNITED STATES PATENT AND TRADEMARK OFFICE
CERTIFICATE OF CORRECTION

| | | |
|---|---|---|
| PATENT NO. | : 9,935,737 B2 | Page 1 of 1 |
| APPLICATION NO. | : 14/748791 | |
| DATED | : April 3, 2018 | |
| INVENTOR(S) | : Mohamed et al. | |

It is certified that error appears in the above-identified patent and that said Letters Patent is hereby corrected as shown below:

On the Title Page

In item (72), in "Inventors", in Column 1, Line 6, delete "SunnyVale," and insert --Sunnyvale,-- therefor In the Claims In Column 16, Line 17, in Claim 11, delete "subcarriers," and insert --sub-carriers,-- therefor In Column 16, Line 63, in Claim 16, delete "ti" and insert --the-- therefor Signed and Sealed this
Fourth Day of June, 2019

Andrei Iancu
*Director of the United States Patent and Trademark Office*